(12) United States Patent
Weismüller et al.

(10) Patent No.: US 7,806,459 B2
(45) Date of Patent: Oct. 5, 2010

(54) CONVERTIBLE WITH A ROOF WHICH CAN BE STORED IN A FOLDING-TOP COMPARTMENT

(75) Inventors: Olaf Weismüller, Bramsche (DE); Udo Heselhaus, Ibbenbüren (DE)

(73) Assignee: Wilhelm Karmann GmbH, Osnabruck (DE)

( * ) Notice: Subject to any disclaimer, the term of this patent is extended or adjusted under 35 U.S.C. 154(b) by 0 days.

(21) Appl. No.: 11/916,532

(22) PCT Filed: Jun. 8, 2006

(86) PCT No.: PCT/DE2006/000984

§ 371 (c)(1), (2), (4) Date: Dec. 19, 2007

(87) PCT Pub. No.: WO2006/131101

PCT Pub. Date: Dec. 14, 2006

(65) Prior Publication Data

US 2008/0217954 A1 Sep. 11, 2008

(30) Foreign Application Priority Data

Jun. 9, 2005 (DE) .................. 10 2005 026 489

(51) Int. Cl.
*B60J 7/00* (2006.01)
(52) U.S. Cl. .................. 296/107.08; 296/107.01; 296/107.18
(58) Field of Classification Search .......... 296/107.08, 296/107.09, 107.17, 136.06, 107.18, 107.01, 296/107.16, 24.44

See application file for complete search history.

(56) References Cited

U.S. PATENT DOCUMENTS

| | | | | |
|---|---|---|---|---|
| 5,209,544 A * | 5/1993 | Benedetto et al. | ...... | 296/107.18 |
| 5,816,644 A * | 10/1998 | Rothe et al. | ............ | 296/107.18 |
| 6,024,086 A * | 2/2000 | Rich | .......................... | 126/664 |
| 6,039,382 A * | 3/2000 | Mather et al. | .......... | 296/107.01 |
| 6,139,087 A * | 10/2000 | Wolfmaier et al. | ..... | 296/107.16 |
| 6,254,165 B1 * | 7/2001 | Neubrand | .................... | 296/76 |
| 6,390,532 B1 * | 5/2002 | Mac Farland | .......... | 296/107.17 |
| 6,419,295 B1 * | 7/2002 | Neubrand | .............. | 296/107.07 |
| 6,419,296 B2 * | 7/2002 | Dintner et al. | ......... | 296/107.18 |

(Continued)

FOREIGN PATENT DOCUMENTS

DE    10162303 A1    7/2003

(Continued)

*Primary Examiner*—Kiran B. Patel
(74) *Attorney, Agent, or Firm*—Gifford, Krass, Sprinkle, Anderson & Citkowski, P.C.; Douglas L. Wathen

(57) ABSTRACT

A convertible vehicle has a vehicle body with a passenger compartment defined therein and a rearward body region with a top storage well defined therein. A movable roof has a closed position extending over the passenger compartment and a stowed position in the top storage well. The top storage well has a base element that is movable between a raised position and a lowered position. The base element covers an intermediate space between the rearward side of the seats and the inner side of the rear roof region when the roof is in the closed position and the base element is in the raised position. A coupling linkage interconnects the base element with the rear roof region such that movement of the roof from the stowed position to the closed position causes movement of the base element.

4 Claims, 4 Drawing Sheets

U.S. PATENT DOCUMENTS

| | | | |
|---|---|---|---|
| 6,425,621 B2 * | 7/2002 | Miklosi et al. | 296/108 |
| 6,464,284 B2 * | 10/2002 | Neubrand | 296/107.01 |
| 6,695,385 B1 * | 2/2004 | Lange | 296/107.12 |
| 6,695,386 B1 * | 2/2004 | Willard | 296/107.17 |
| 6,824,194 B2 * | 11/2004 | Weissmueller et al. | 296/136.05 |
| 6,830,284 B2 * | 12/2004 | Guillez et al. | 296/108 |
| 6,843,523 B2 * | 1/2005 | Nania | 296/136.05 |
| 6,871,901 B2 * | 3/2005 | Stenvers et al. | 296/108 |
| 7,063,371 B2 * | 6/2006 | Willard | 296/107.17 |
| 7,093,885 B2 * | 8/2006 | Guillez et al. | 296/107.08 |
| 7,125,065 B2 | 10/2006 | Haberl et al. | |
| 7,287,801 B2 * | 10/2007 | Harrison et al. | 296/107.09 |
| 2002/0030380 A1 * | 3/2002 | Rothe et al. | 296/107.07 |
| 2002/0105205 A1 * | 8/2002 | Willard | 296/107.07 |
| 2003/0189355 A1 | 10/2003 | Hahn et al. | |
| 2004/0189040 A1 * | 9/2004 | Wojciech et al. | 296/108 |
| 2005/0200158 A1 * | 9/2005 | Willard | 296/108 |
| 2007/0108793 A1 * | 5/2007 | Schumacher et al. | 296/107.08 |
| 2007/0158972 A1 * | 7/2007 | Jahn et al. | 296/108 |
| 2007/0194594 A1 * | 8/2007 | Heselhaus | 296/107.01 |
| 2007/0194596 A1 * | 8/2007 | Heselhaus | 296/107.07 |
| 2007/0205630 A1 * | 9/2007 | Hollenbeck | 296/107.04 |
| 2008/0001438 A1 * | 1/2008 | Zentgraf | 296/210 |
| 2008/0054673 A1 * | 3/2008 | Weismuller et al. | 296/124 |
| 2008/0143138 A1 * | 6/2008 | Spickermann | 296/107.18 |
| 2008/0197666 A1 * | 8/2008 | Brockhoff | 296/107.08 |
| 2008/0217954 A1 * | 9/2008 | Weismuller et al. | 296/107.08 |
| 2009/0085369 A1 * | 4/2009 | Willard et al. | 296/107.01 |

FOREIGN PATENT DOCUMENTS

| | | |
|---|---|---|
| DE | 10339274 A1 | 1/2005 |
| WO | WO2005/102756 | 11/2005 |

* cited by examiner

CONVERTIBLE WITH A ROOF WHICH CAN BE STORED IN A FOLDING-TOP COMPARTMENT

REFERENCE TO RELATED APPLICATIONS

This application is the United States national phase application of Patent Cooperation Treaty No. PCT/DE06100984, filed Jun. 8, 2006, which claims priority from German patent application No. DE102005026489, filed Jun. 9, 2005, the entire content of both of which is incorporated herein by reference.

FIELD OF THE INVENTION

The present invention relates to a convertible vehicle having a movable roof which can be stowed in a top storage well in a rear body region.

BACKGROUND OF THE INVENTION

It is known to design the top storage well in for a convertible vehicle such that it is variable in size. Such a storage well has a maximum size for receiving the roof and a reduced size when the roof is closed, thereby providing additional room in the adjacent trunk.

Such a design is shown in DE 298 09 008 U1. The bottom portion of the top storage well is vertically movable and provides the function of downwardly bounding the top storage well only in the lowered position. When the bottom portion of the storage well is in the raised position, it has no function and, due to its own extent, only bounds the available trunk.

DE 101 62 303 A1 shows a bottom portion of a top storage well which can be raised manually and forms a parcel shelf in the raised position. Raising the bottom portion, however, requires force expenditure and entails the risk of tilting the bottom portion of the top storage well across the width of the passenger compartment. In addition, the bottom portion must be securely latched at both sides at least in the upper position, which requires manual alignment and additional work and risks an operation error.

SUMMARY OF THE INVENTION

The present invention provides a convertible vehicle with a vehicle body having a passenger compartment defined therein and a rearward body region with a top storage well defined therein. A movable roof has a closed position extending over the passenger compartment and a stowed position in the top storage well. The top storage well has a base element that is movable between a raised position and a lowered position. The base element covers an intermediate space between the rearward side of the seats and the inner side of the rear roof region when the roof is in the closed position and the base element is in the raised position. A coupling linkage interconnects the base element with the rear roof region such that movement of the roof from the stowed position to the closed position causes movement of the base element.

The base element can serve as a parcel shelf in the raised position and thus ensures that a visual cover is provided behind the rear or front seat backrests (with a two-seater). This visual cover extends up to the inner side of the rear roof region. To minimize the control and drive effort for the movable base element and to ensure a high operating comfort, the base element is connected to and moved upwardly by the roof during the closing movement of the roof. The lowering of the parcel shelf/base element can also take place via the parcel shelf's/base element's own weight. The parcel shelf/base element can be held in the upper position by the roof which is latched in the closed position without any manual latching. The present invention avoids both the manual raising of the base element, which is frequently bulky, and the difficult precise alignment necessary for latching. The parcel shelf/base element can provide an additional storage surface with the roof closed, which can represent a special additional benefit particularly with convertible vehicles which frequently have comparatively little available space.

The base element can be shaped like a tub with raised edges in order to provide more storage in the raised position. In addition, the base element serving as a parcel shelf can also be designed to match the passenger compartment, for instance by being covered with a matching color leather.

This is particularly favorable since the parcel shelf/base element is, for example, also easily visible from the outside through the rear window when the roof is closed.

The base element can be connected to the rear roof region via a coupling linkage so that the total upward and downward movement of the base element can be driven by this linkage. This results in a defined and jerk-free movement procedure in both directions.

To minimize the space required for the coupling linkage, the linkage can extend through the base element, for instance through longitudinally disposed narrow gap openings in the base element. For this purpose, flexible trimming, for example textile trim, can seal the openings into the parcel shelf/base element. This also prevents small parts from falling through.

The base element can be connected to the body via a covered multi-bar linkage, for example, a four-bar linkage. This multi-bar linkage may cause an additional longitudinal movement component in addition to the upward or downward movement controlled by the roof.

A gap at the front side and/or rear side of the base element can be covered by a flexible cover which is attached to the base element. This flexible cover further improves the usability of the base element.

The forces on the stowed roof and the movement mechanism can be reduced if the base element lies indirectly or directly on rear wheel housings in the lowered position and is thus supported thereby. In particular when a coupling linkage is provided, a secure and direct placing of the base element on a lower support surface also results in the lowering of the parcel shelf into its lowered position without the need for a manual precise alignment or readjustment.

The base element bounds an additional space which is a component of the top storage well in the lowered position of the base element and is a component of the trunk in the raised position.

BRIEF DESCRIPTION OF THE DRAWINGS

Advantages of the present invention will be readily appreciated as the same becomes better understood by reference to the following detailed description when considered in connection with the accompanying drawings.

DETAILED DESCRIPTION OF THE INVENTION

Figure 1:
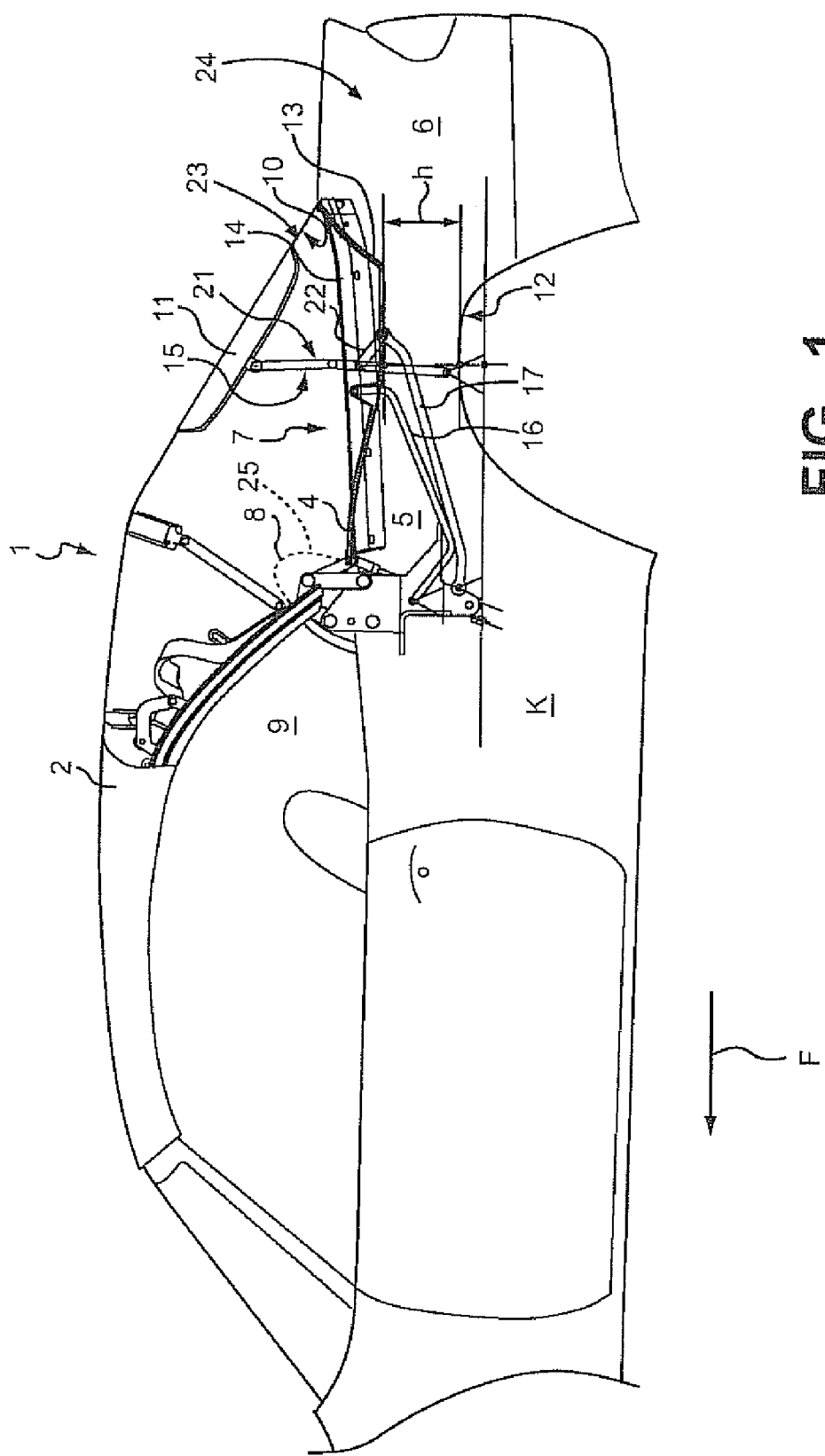
FIG. 1 is a schematic side view of a convertible vehicle in accordance with the present invention with the roof closed and partly cut away, and with a base element of the top storage well raised to be the parcel shelf.

A convertible vehicle 1, which is only partially shown in the Figures, includes a movable roof 2 which can be stowed in a top storage well 3 in the rearward body region 24 when in an open position. The top storage well 3 is variable in size and includes at least one movable base element 4. In the illustrated embodiment, the movable base element 4 forms the entire base or bottom of the top storage well 3 and is movable up and down by the vertical distance h. The movement of the base element does not have to be a purely vertical movement, but can include a component in the longitudinal direction of the vehicle. It is also not required for raised and lowered positions to be parallel as is shown.

As becomes clear from FIG. 1, with the roof 2 closed and the base element 4 in the raised position 4, an additional space 5 under the base element 4 is provided for the trunk 6 which is disposed below and at the rear side of the top storage well 3. When the base element 4 is in the lowered position, the base element defines the lower end of the additional space 5. The additional space is then a component of the top storage well 3 which is enlarged by this additional space 5 and can receive the open roof 2.

Figure 2:
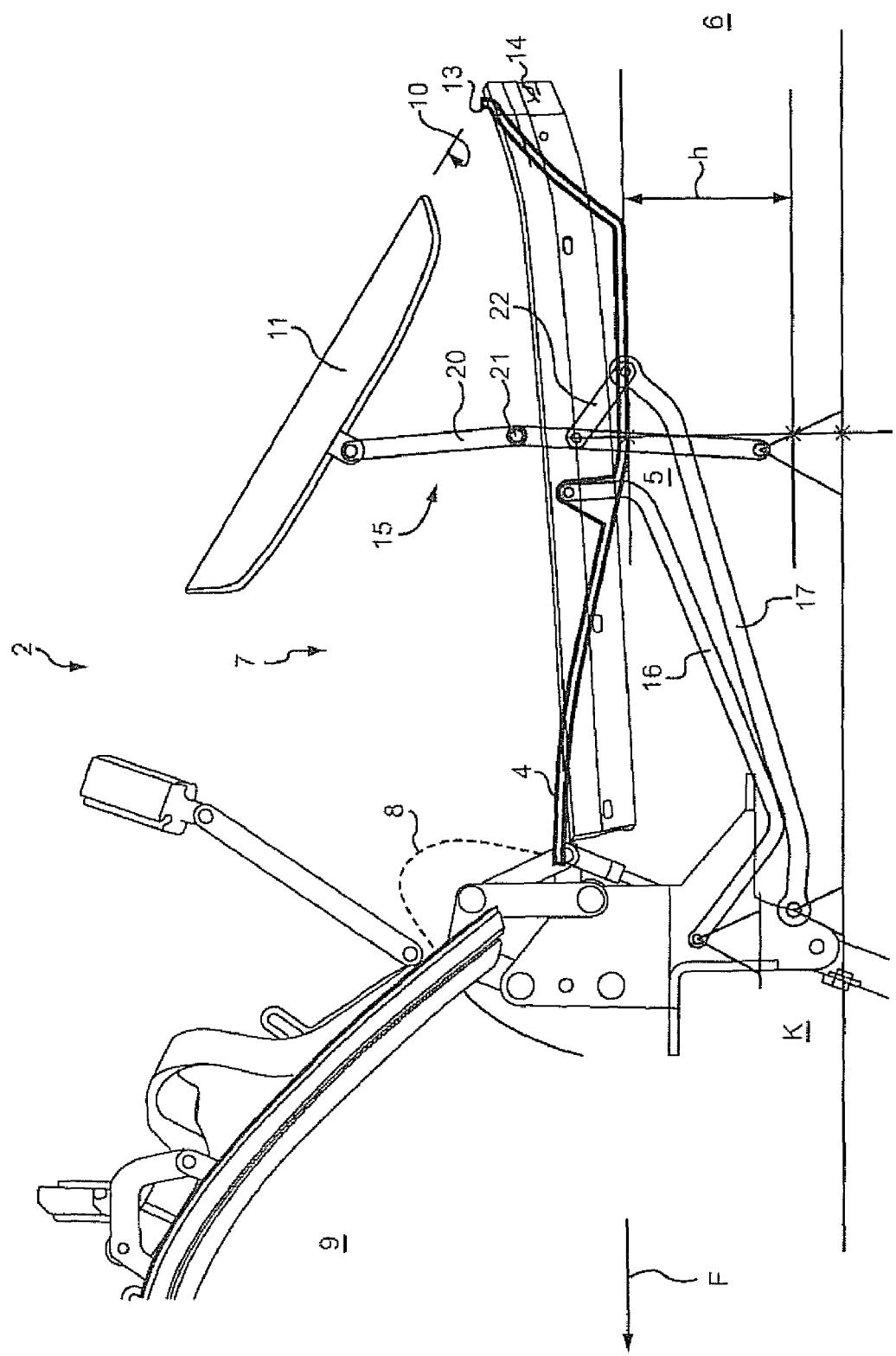
FIG. 2 is a detailed view of a rear portion of the closed roof and of the parcel shelf/base element in the same position as in FIG. 1.

The base element 4 serves as a parcel shelf in the raised position with the roof closed as shown in FIGS. 1 and 2 and covers an intermediate space 7 which is defined longitudinally between a rearward side 25 of the seats 8 of the passenger compartment 9 and of the inner side 10 of the rear roof region 23. With a two-seater, the seats 8 are the front seats; with a four-seater or a vehicle with more seats, the seats are a rear seat row.

The parcel shelf/base element 4 preferably covers the entire intermediate space 7 and also seals to the inner side 10 of the rear roof region 23, defined by the lower edge of the roof below a rear window 11. This lower edge may be formed, for example, by a rigid material retaining bracket 14 such that not even any small objects, for example ballpoint pens or small children's toys, can fall through. The rear edge 13 of the parcel shelf/base element 4 may extend upwardly for this purpose and be disposed at a small spacing in front of the upper edge of the material retaining bracket 14 with the roof closed. The rigid material retaining bracket 14 thereby prevents the edge 13 from being bent downwardly, even when the parcel shelf/base element 4 is formed from a resilient light construction material.

The parcel shelf/base element 4 can be tub-shaped to improve its function as a reception space for light objects, such as jackets or the like, with the roof 2 closed. The parcel shelf/base element may be designed as a one-piece molded part.

Figure 4:
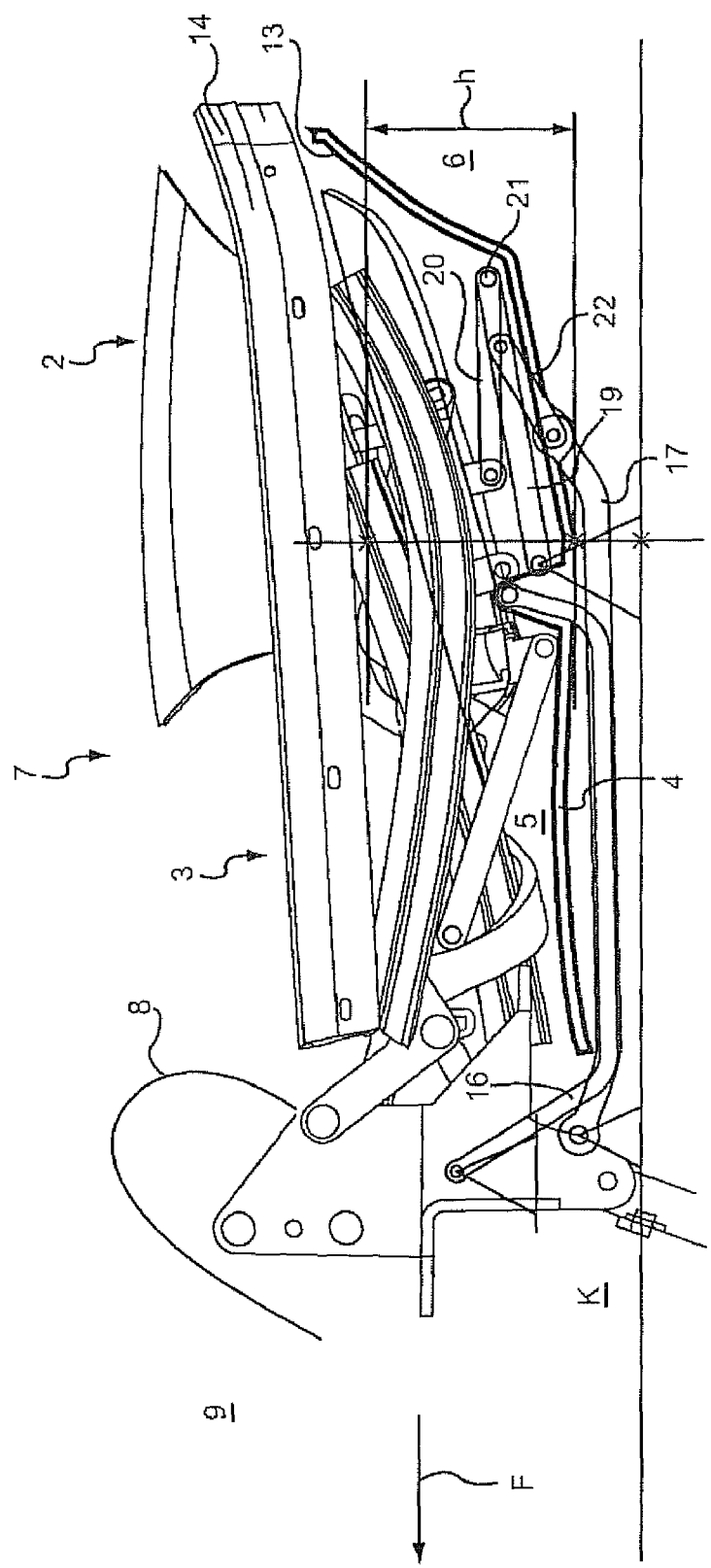
FIG. 4 is a similar view to FIG. 3 with the base element of the top storage well fully lowered and the roof placed thereon.

The movable base element 4, which forms the parcel shelf when the roof 2 is closed, is connected to the roof 2 for movement therewith and is moved by the roof at least during the closing movement (i.e., the transition from FIG. 4 to FIG. 2). Neither a separate drive nor a separate control for the movement of the parcel shelf/base element 4 is required. Manual manipulation and alignment of the wide base element 4 is avoided.

Figure 3:
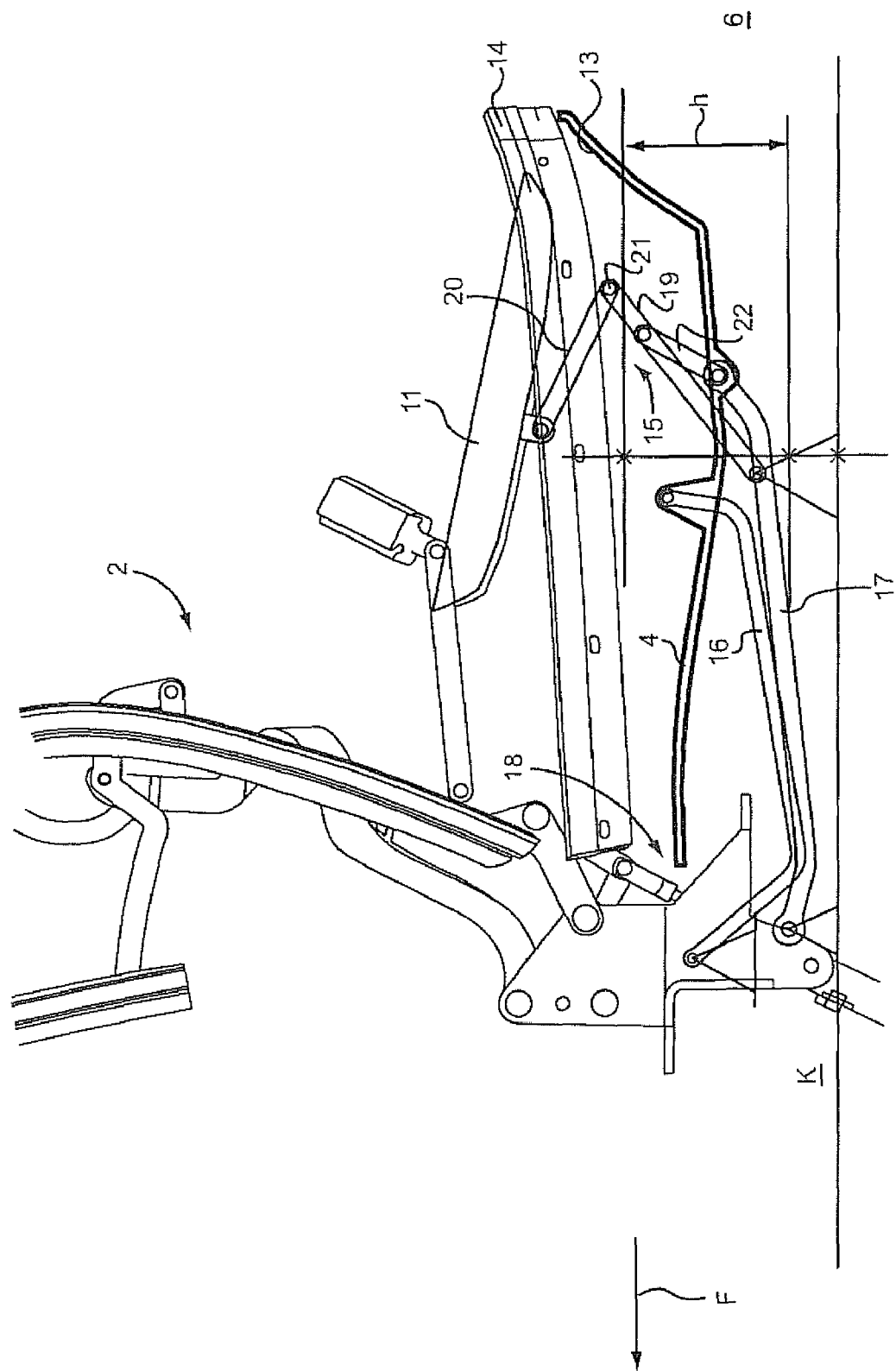
FIG. 3 is a similar view to FIG. 2 during the roof opening and during the lowering of the parcel shelf/base element associated therewith.

The reverse movement (i.e., the transition from FIG. 2 to FIG. 4) could also take place via the inherent weight of the base element 4 on the lowering of the roof 2. In the illustrated embodiment, however, the base element 4 is linked via a coupling linkage 15 to the roof 2 such that the roof clearly defines the position of the base element 4 throughout the movement. This coupling linkage 15 also holds the parcel shelf/base element 4 in the raised position with the roof closed and can pull the parcel shelf/base element toward the rear region 23 of the roof 2 to form a seal. The parcel shelf/base element 4 can support a substantial weight load due to the connection 15 to the closed roof 2, which is latched to the windshield frame.

The base element 4 can also be linked to the body K at each vehicle side via a multi-bar linkage. In the illustrated embodiment, the multi-bar linkage is a four-bar linkage with links 16, 17 arranged longitudinally in the vehicle. These links 16, 17 are connected to the body at two joints and are movably connected to the parcel shelf/base element 4 at two joints. The axes of these joints extend transversely with respect to the vehicle. Since the links 16, 17 extend rearwardly from the joints at the body to the parcel shelf/base element 4, downward movement of the parcel shelf is associated with a movement component rearwardly against the direction of travel F.

A flexible cover, such as a textile cover, may be provided at the front side and/or also at the rear side of the base element 4 to bridge the gaps, such as gap 18 caused by the movement of the package shelf. The cover further improves the usability of the parcel shelf/base element; small parts are also reliable secured against falling through.

The coupling linkage 15 may extend through the base element 4 at both transverse sides, for example via slot cutouts. In the illustrated embodiment, the coupling linkage 15 includes links 16, 17, 19, 20 and 22. In the illustrated embodiment, the coupling linkage 15 includes a first link 19 attached to the body K and a second link 20 hingedly connected to the frame of the rear window 11. The links 19, 20 can be folded on one another at a joint 21 during opening and lowering of the roof. An intermediate link 22 is provided as a linking element to the parcel shelf/base element 4 and connects the link 19 thereto. The intermediate link can also connect to a joint on the link 16 or 17 such that no separate joint is required at the parcel shelf/base element 4 for this purpose. The opening movement or closing movement of the roof controls the movement of the parcel shelf/base element 4 in a clear manner.

The forces on the coupling linkage can be relieved if the base element 4 is supported on the lateral wheel housings 12 when the roof is open (FIG. 4). Supports or the like may be attached to the wheel housings 12 for this purpose.

In addition, the base element 4 does not have to be self-supporting, since it is held by the roof 2. Stiffened portions to lend the base element 4 increased stability, in particular at lateral transverse edges, can thus be dispensed with or can be reduced. The construction height of the base parcel shelf/base element can thus also be reduced so that more room remains for the trunk even with the parcel shelf/base element in the raised position. This represents a further advantage of the invention.

The invention has been described in an illustrative manner. It is, therefore, to be understood that the terminology used is intended to be in the nature of words of description rather than of limitation. Many modifications and variations of the invention are possible in light of the above teachings. Thus, within the scope of the appended claims, the invention may be practiced other than as specifically described.

We claim:

1. A convertible vehicle comprising:

a vehicle body having a passenger compartment defined therein and a rearward body region with a top storage well defined therein;

seats disposed in the passenger compartment, the seats having a rearward side;

a movable roof having a closed position extending over the passenger compartment and a stowed position in the top storage well, the movable roof having a rear roof region with an inner side, an intermediate space being defined between the rearward side of the seats and the inner side of the rear roof region when the roof is in the closed position;

the top storage well having a base element that is movable between a raised position and a lowered position, the base element covering the intermediate space when the roof is in the closed position and the base element is in the raised position; and a coupling linkage interconnecting the base element with the rear roof region such that movement of the movable roof from the stowed position to the closed position causes movement of the base element from the lowered position to the raised position.

2. A convertible vehicle according to claim 1, wherein the coupling linkage extends through the base element.

3. A convertible vehicle according to claim 1, wherein the coupling linkage is a multi-bar linkage interconnecting the base element to the vehicle body.

4. A convertible vehicle according to claim 1, wherein the base element bounds an additional space which forms part of the top storage well when the base element is in the lowered position and which is a component of a vehicle trunk when the base element in the raised position.

* * * * *

UNITED STATES PATENT AND TRADEMARK OFFICE
CERTIFICATE OF CORRECTION

PATENT NO. : 7,806,459 B2  
APPLICATION NO. : 11/916532  
DATED : October 5, 2010  
INVENTOR(S) : Olaf Weismüller et al.

Page 1 of 1

It is certified that error appears in the above-identified patent and that said Letters Patent is hereby corrected as shown below:

Column 4, line 28: Replace "reliable" with --reliably--;  
Column 4, line 55: Before "parcel" remove --base--; and  
Column 6, line 17: After "element" insert --is--.

Signed and Sealed this  
Eleventh Day of January, 2011

David J. Kappos  
*Director of the United States Patent and Trademark Office*